United States Patent
Ehmann et al.

(10) Patent No.: US 7,494,716 B2
(45) Date of Patent: Feb. 24, 2009

(54) METHOD FOR THE ANODIC ELECTROPHORETIC ENAMELLING AND ELECTROPHORETIC PAINTS

(75) Inventors: Eduard Ehmann, Wuppertal (DE); Manfred Evers, Velbert (DE); Andreas Fieberg, Düsseldorf (DE); Konstadinos Markou, Köln (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 151 days.

(21) Appl. No.: 10/168,208

(22) PCT Filed: Dec. 13, 2000

(86) PCT No.: PCT/EP00/12647

§ 371 (c)(1),
(2), (4) Date: Jun. 14, 2002

(87) PCT Pub. No.: WO01/44382

PCT Pub. Date: Jun. 21, 2001

(65) Prior Publication Data

US 2003/0004231 A1    Jan. 2, 2003

(30) Foreign Application Priority Data

Dec. 16, 1999  (DE) ................ 199 60 693

(51) Int. Cl.
*B32B 15/092*  (2006.01)
*B32B 27/38*  (2006.01)
*C08L 63/00*  (2006.01)
*C25D 13/06*  (2006.01)
*C25D 9/02*  (2006.01)

(52) U.S. Cl. ............ 428/418; 428/413; 523/400; 528/106; 528/108; 205/316; 205/317; 205/318; 205/320

(58) Field of Classification Search .......... 205/316, 205/317, 318, 320; 523/400; 528/106, 108; 428/413, 414, 416, 418

See application file for complete search history.

(56) References Cited

U.S. PATENT DOCUMENTS

| | | | | |
|---|---|---|---|---|
| 4,259,163 | A | * 3/1981 | Suzuki et al. | 204/484 |
| 4,289,812 | A | * 9/1981 | Martin | 427/379 |
| 4,461,857 | A | 7/1984 | Sekmakas et al. | |
| 4,692,484 | A | 9/1987 | Roberts | |
| 4,737,529 | A | * 4/1988 | Sekmakas et al. | 523/411 |
| 4,829,105 | A | * 5/1989 | Yamada et al. | 523/415 |
| 4,943,359 | A | * 7/1990 | Patzschke et al. | 204/479 |
| 4,957,952 | A | 9/1990 | Sekmakas et al. | |
| 5,264,469 | A | 11/1993 | Mysliwczyk et al. | |
| 5,344,858 | A | 9/1994 | Hart et al. | |
| 5,578,669 | A | * 11/1996 | Odawa et al. | 524/414 |

FOREIGN PATENT DOCUMENTS

| | | |
|---|---|---|
| EP | 0174628 A2 | 3/1986 |
| EP | 0216337 A2 | 4/1987 |
| EP | 0240876 A2 | 10/1987 |
| EP | 0379076 A2 | 7/1990 |
| WO | WO 93/07206 | 4/1993 |

OTHER PUBLICATIONS

PCT International Search Report, Application No. PCT/EP00/12647.
PCT International Search Report, Application No. PCT/EP00/12647, 2001.

* cited by examiner

*Primary Examiner*—Michael J Feely

(57) ABSTRACT

Process for the anodic electro-dipcoating of conducting surfaces by dipping in an aqueous anodic electro-dipcoating bath and connecting up as the anode, in which an aqueous anodic electro-dipcoating bath is used that contains 1 to 15 wt. %, referred to the binder solids of the electro-dipcoating bath, of one or more phosphoric acid epoxy esters and/or phosphonic acid epoxy esters that have been produced in the presence of alcohols.

10 Claims, No Drawings

METHOD FOR THE ANODIC ELECTROPHORETIC ENAMELLING AND ELECTROPHORETIC PAINTS

BACKGROUND OF THE INVENTION

The present invention relates to a process for electro-dipcoating that is particularly suitable for producing coating films having a desired degree of matteing and improved edge protection, as well as the electrodeposition lacquers suitable therefor. Electro-dipcoating is a fully automated, environmentally friendly and economic application method and is therefore used in practice in the mass production lacquering of electrically conducting surfaces, in particular metal surfaces. Electro-dipcoating is a fully automated application method with a high application efficiency. The process preferably takes place in closed cycles and permits the recycling of excess lacquer material as well as the auxiliary substances and process materials that are used.

In order to improve the corrosion resistance of the coating films, corrosion-inhibiting pigments such as lead or chromium compounds, for example lead chromate, basic lead silicate or strontium chromate, are often added to the electrodeposition lacquers. These compounds are however not desirable for health and environmental safety reasons.

The pigments such as zinc phosphates, aluminium phosphates, zinc oxide, etc. that have been proposed as being less toxic do not provide satisfactory corrosion prevention results. Also, the zinc compounds in the electro-dipcoating baths may lead to instabilities.

The addition of lanthanum salts of organic acids such as for example lanthanum acetate is accordingly proposed in DE-A-43 06 024. However, no satisfactory results can be obtained as regards edge protection.

Crosslinked polymer microparticles based on epoxy resins are described in DE-A-42 25 999, which are used as organic fillers, matteing agents and/or reinforcing agents in conventional electrodeposition lacquers for priming vehicle bodies. These electrodeposition lacquers do not provide satisfactory results as regards edge protection either.

EP-A-0 240 876, EP-A-0 216 337, WO 93/07206 and EP-A-0 174 628 describe electro-dipcoating with baths to which phosphoric acid epoxy esters are added. The latter are produced from epoxy compounds with phosphoric acid in the presence of water. It has been found that these baths have an insufficient bath stability and that a relatively high redissolution of the deposited lacquer material takes place in the rinsing zones of the paint shops.

The object of the present invention was accordingly to provide a process for anodic electro-dipcoating that does not have these disadvantages and that produces lacquer films having improved properties compared to the prior art, in particular as regards an improvement in the edge protection, and moreover permits an arbitrary adjustment of the degree of matteing and is in addition highly versatile, in which the baths are also stable and the redissolution is reduced.

SUMMARY OF THE INVENTION

It has surprisingly been found that this object can be achieved by deposition from aqueous anodic electro-dipcoating baths that contain a small amount of phosphoric acid epoxy esters and/or phosphonic acid epoxy esters that have been produced in the presence of alcohols. The present invention accordingly relates to a process for the anodic electro-dipcoating of conducting surfaces, in particular metal surfaces, by dipping in an aqueous anodic electro-dipcoating bath and connecting up as the anode, which is characterised in that an aqueous anodic electro-dipcoating bath is used that contains 1 to 15 wt. %, preferably 5 to 10 wt. % referred to the binder solids of the electro-dipcoating bath, of one or more phosphoric acid epoxy esters and/or phosphonic acid epoxy esters with an acid number of 10 to 50 that are obtained by reacting one or more monomeric, oligomeric or polymeric epoxy compound(s) with phosphoric acid or phosphonic acid or their esters or mixtures thereof in the presence of one or more alcohols. The expression binder solids in the present context is understood to denote the solids content of film-forming resin (binder) as well as of optionally present crosslinking agents and paste resin (for dispersing pigments and/or fillers).

The present invention also provides an aqueous electro-dipcoating bath with a content of one or more film-forming binders as well as optionally crosslinking agents, pigments, fillers, organic solvents and/or conventional lacquer additives, which is characterised in that it contains 1 to 15 wt. %, referred to the binder solids, of one or more phosphoric acid epoxy esters and/or phosphonic acid epoxy esters with an acid number of 10 to 50 that are obtained by reacting one or more monomeric, oligomeric or polymeric epoxy compound (s) with phosphoric acid or phosphonic acids or their esters or mixtures thereof in the presence of one or more alcohols.

The present invention moreover provides for the use of the aforementioned phosphoric acid epoxy esters and/or phosphonic acid epoxy esters as additives for electro-dipcoating baths.

DETAILED DESCRIPTION OF THE INVENTION

In anodic electro-dipcoating (AED) a workpiece with an electrically conducting surface of metal or of electrically conducting plastics material or of a substrate provided with an electrically conducting coating is placed in an aqueous AED bath and connected up as anode to a direct current source. When a direct current is applied the polymer particles of the aqueous dispersion of the AED bath made water-soluble or water-dispersible by at least partial salt formation migrate to the anode and react there with the ions formed by the simultaneously occurring electrolysis of water to reform the water-insoluble polymer, which coagulates from the aqueous phase and is deposited with the additives dispersed therein, as a lacquer film on the anode. The principle of electro-dipcoating is known and is described in the literature, for example in Metalloberfläche 31 (1977) 10, pp. 455-459.

The aqueous anodic electro-dipcoating bath is produced ready-for-use in a conventional manner by adding an anodic electrodeposition lacquer to an aqueous medium. The electrodeposition lacquer may in this connection, depending on the intended use, be present in single-component form (pigmented binder component plus optionally crosslinking component) or two-component form (pigment paste and binder component as well as optionally crosslinking component) as a concentrate (replenishment material) or in pre-diluted form with water (initial batch) having different degrees of neutralisation.

The phosphoric acid epoxy esters and/or phosphonic acid epoxy esters may be incorporated as desired either into the finished electrodeposition lacquer or during its production or into the ready-for-use electro-dipcoating bath or during its preparation.

For example the anodic electrodeposition lacquer may be produced in a conventional manner known to the person skilled in the art, by mixing one or more suitable binder(s) or binder dispersion(s) with the phosphoric acid epoxy esters and/or phosphonic acid epoxy esters and with optionally one or more crosslinking agent(s) as well as optionally conventional additives and/or lacquer additives such as for example catalysts, light stabilisers, optical brighteners, biocidal components, neutral resins, layer-forming agents, emulsifiers and optionally pigments and/or fillers. The phosphoric acid or phosphonic acid epoxy esters may however also be added to the finished electrodeposition lacquer and/or to the ready-for-use electro-dipcoating bath and/or to an already operating electro-dipcoating bath.

Suitable phosphoric acid and/or phosphonic acid epoxy esters are obtained by reacting one or more monomeric, oligomeric or polymeric epoxy compound(s) with phosphoric acid or phosphonic acids and/or their esters or with mixtures of these acids or their esters in the presence of one or more alcohols. Examples include phosphoric acid, phosphoric acid diethyl ester, phosphoric acid triethyl ester, phosphoric acid dibutyl ester, phosphoric acid tributyl ester, hydroxymethanephosphonic acid, hydroxyethanephosphonic acid, vinylphosphonic acid, allylphosphonic acid or benzylphosphonic acid diethyl ester; o-phosphoric acid is preferably employed. Due to the presence of alcohols during the reaction, mixed esters with low acid numbers of 10 to 50 are formed at least in some cases.

The epoxy compounds have on average at least one, preferably at least two epoxy groups per molecule and an epoxy equivalent weight of 90 to 4000 g/equivs., preferably 150 to 3500 g/equivs., particularly preferably 400 to 3000 g/equivs.

The epoxy compounds may be saturated as well as unsaturated and also aliphatic, cycloaliphatic, aromatic and/or heterocyclic, and may also contain hydroxyl groups. They may furthermore contain such substituents and/or functional groups that do not lead to any interfering secondary reactions under the reaction conditions, such as for example alkyl substituents or aryl substituents and ether groups.

Examples of suitable epoxy compounds are condensation products of epichlorohydrin and bisphenol A, such as for example Epikote® types from Shell, Araldite® from Ciba Geigy, or D.E.R.®, D.E.M.®, D.E.H.® types from Dow Chemical, epoxy group-containing novolaks, glycidyl ethers of polyhydric alcohols, glycidyl esters of polycarboxylic acids, epoxidation products of naturally occurring fats and oils, epoxidised polybutadienes or low molecular weight acrylate resins with side-positional oxirane groups. A detailed list of epoxy compounds that are suitable for the invention is given on pages 247 to 251 of "Lackharze" by Stoye/Freitag, 1996 Carl Hanser Verlag, Munich, Vienna, which is included here by way of reference.

The ratio of the epoxy groups of the epoxy compounds to the number of acid groups of the phosphoric and/or phosphonic acids that are to be reacted therewith is preferably 1:1 to 3:1.

The reaction of the epoxy compounds with phosphoric acid or phosphonic acid is carried out in the presence of one or more alcohols, optionally with the addition of solvents, for example at temperatures from 80° to 110° C. The amount of alcohol for the formation of the reaction products present in some cases as mixed esters is chosen for example so that the solids content of the organic phase consisting of epoxy compound, phosphoric acid or phosphonic acid and/or their derivatives and alcohol that is formed before the chemical reaction is in the range from preferably 65 to 85 wt. %, particularly preferably from 70 to 80 wt. %. The reaction may be carried out for example under gentle refluxing. The preparation of the mixed esters is preferably carried out in the absence of water. The reaction is carried out to an acid number of 10 to 50, preferably 15 to 40. The reaction product may be converted into an aqueous dispersion. For this, a neutralising agent may be added to neutralise the free acid functions and diluted to the desired solids content using fully deionised water, for example at least 50% of the free acid functions being converted into the salt form.

Suitable alcohols include for example aliphatic alcohols, e.g. lower aliphatic alcohols with 1 to 6 carbon atoms such as n-butanol, tert.-butanol, sec.-butanol, isopropanol, n-propanol, methanol, ethanol and/or hexanol.

Suitable solvents that may be used in the reaction are esters, ethers, ketones and aromatic compounds.

Suitable as neutralising agents are conventional bases such as may also be used in the production of the anodic electrodeposition lacquers, such as for example NaOH, KOH, LiOH, ammonia, primary, secondary and tertiary amines such as diethylamine, triethylamine, morpholine; alkanolamines such as diisopropanolamine, dimethylaminoethanol, triisopropanolamine, dimethylamino-2-methylpropanol; quaternary ammonium hydroxides or also mixtures of such neutralising agents.

As suitable binders for the anodic electrodeposition lacquers there may be used all conventional binder systems, for example those having an acid number of 20 to 150, preferably 20 to 120, and a hydroxyl number of 0 to 150, preferably 20 to 120, such as are normally used for aqueous coating systems, in particular for anodic electrodeposition lacquer coatings.

Suitable binders include for example polyester, polyacrylate and polyurethane resins, such as for example alkyd resins, urethanised polyester resins or acrylated polyester or polyurethane resins, oils reacted with maleic acid, epoxy esters, polybutadiene oil reacted with maleic acid, as well as mixtures of these resins. Polyester resins are preferred.

Suitable polyester resins are for example carboxyl group-containing and hydroxyl group-containing polyesters with an acid number of 20 to 150 and a hydroxyl number of 20 to 150. They are produced according to processes known to the person skilled in the art, by polycondensation of polyhydric alcohols and polybasic carboxylic acids or carboxylic acid anhydrides, as well as optionally aliphatic and/or aromatic monocarboxylic acids. The content of carboxyl and hydroxyl groups is adjusted in a manner known per se by an appropriate choice of the type and quantitative ratios of the starting components. The carboxyl groups may for example be introduced by semi-ester formation from a previously prepared, hydroxyl group-containing polyester resin using acid anhydrides. The incorporation of carboxyl groups may also be carried out for example by the co-use of hydroxycarboxylic acids in the polycondensation reaction.

Suitable polycarboxylic acids, in particular dicarboxylic acids, and suitable polyols for the polycondensation may for example be aliphatic, cycloaliphatic or aromatic.

The polyols used for the production of the polyesters are for example diols such as alkylene glycols, for example ethylene glycol, butylene glycol, hexanediol, hydrogenated bisphenol A, 2,2-butylethylpropanediol, neopentyl glycol and/or other glycols such as for example dimethylolcyclohexane. Higher functional OH components or mixtures of monofunctional and higher functional OH components may also be used, such as for example trimethylolpropane, pentaerythritol, glycerol, hexanetriol; polyether polyols that are condensates of glycols with alkylene oxides; monoethers of such glycols such as diethylene glycol monoethyl ether, tripropylene glycol monomethyl ether.

The acid components of the polyester preferably consist of low molecular weight dicarboxylic acids or their anhydrides with 2 to 18 carbon atoms. Suitable acids include for example phthalic acid, isophthalic acid, terephthalic acid, hexahydrophthalic acid, adipic acid, azelaic acid, sebacic acid, fumaric acid, maleic acid, glutaric acid, succinic acid, itaconic acid and/or 1,4-cyclohexanedicarboxylic acid. Instead of these acids their methyl esters or anhydrides, where these exist, may also be used. In order to obtain branched polyesters it is also possible to add amounts of higher functional carboxylic acids, such as for example trifunctional carboxylic acids such as trimellitic acid, malic acid, aconitic acid, bishydroxyethyltaurine as well as dimethylolpropionic acid, dimethylolbutyric acid or bisanhydrides. Polycarboxylic acids that do not form cyclic anhydrides are preferred.

The polyester resins may for example also be modified by the incorporation of unsaturated compounds, isocyanate group-containing compounds, or by seeded polymerisation or graft polymerisation with ethylenically unsaturated compounds. Preferred polyesters are for example carboxyl group-containing polyesters with an acid number of 20 to 120 and a hydroxyl number of 20 to 150, preferably 60 to 120. They are for example reaction products of dihydric and/or polyhydric aliphatic or cycloaliphatic saturated alcohols, aliphatic, cycloaliphatic and/or monocyclic aromatic dibasic or polybasic polycarboxylic acids, and optionally linear or branched, saturated or unsaturated aliphatic and/or cycloaliphatic C3 to C20 monoalcohols or monocarboxylic acids. The quantitative ratios of the starting components are calculated from the molar ratios that lead to the desired acid numbers and hydroxyl numbers of the resin. The choice of the individual starting components may easily be made by the person skilled in the art having regard to the intended use.

The number average molecular weight Mn of the polyester resins that can be used, measured against polystyrene as calibration substance, is for example 1000 to 6000, preferably 2000 to 4000.

According to a preferred embodiment carboxyl group-containing oil-free polyesters are used, as are described for example in DE-A-32 47 756. These polyesters preferably contain, incorporated by condensation, 0.3 to 3.0 milliequivalents, particularly preferably 0.5 to 2.5 milliequivalents of aliphatic, cycloaliphatic and/or aromatic dicarboxylic acids per gram of resin. Preferably tribasic or polybasic cyclic carboxylic acids are bound in an amount of 0.8 to 2.0, preferably 0.9 to 1.8, particularly preferably 1.1 to 1.5 millimoles per gram of resin via only one carboxyl group to the polyester. As polycarboxylic acids there may be used tribasic and/or polybasic polycarboxylic acids, preferably tribasic and/or tetrabasic acids. The production of these polyesters is carried out in a manner known per se by polycondensation of the starting substances, the polycondensation preferably being carried out stepwise in order to avoid turbidity and gel formation.

With this preferred embodiment the esterification of preferably aromatic and cycloaliphatic dicarboxylic acids that are unable to form an intramolecular anhydride is preferably carried out with dihydric alcohols that either contain secondary OH groups or primary OH groups sterically hindered by β-substitution, an OH group-containing polyester being formed by an excess of alcohol. The alcohols preferably contain 2 to 21 C atoms, particularly preferably 4 to 8 C atoms. The dicarboxylic acids preferably contain 5 to 10 C atoms, particularly preferably 6 C atoms.

Examples of suitable dicarboxylic acids are isophthalic acid, terephthalic acid, 1,3-cyclohexanedicarboxylic acid and 1,4-cyclohexanedicarboxylic acid or alkyl-substituted dicarboxylic acids such as butylisophthalic acid. Isophthalic acid is particularly preferred.

On the other hand dimethyl esters such as terephthalic acid dimethyl ester or 1,4-cyclohexanedicarboxylic acid dimethyl ester may also be introduced into the polyester by transesterification, optionally in the presence of transesterification catalysts. In order to achieve branchings, in place of part of the dicarboxylic acids a corresponding amount of a tricarboxylic acid such as trimellitic anhydride may be incorporated by condensation into the resin molecule.

In the preferred embodiment, as dihydric alcohols there are used for example neopentyl glycol, hydroxypivalic acid neopentyl glycol ester, hexanediol-2,5,1,4-bis(hydroxy-methyl)cyclohexane, 1,1-isopyrilidine-bis-(p-phenoxy)-2-propanol, 2,2,4-trimethylolpentanediol-1,3 as well as mixtures thereof. As dihydric alcohol there may for example also be used the glycidyl ester of α-branched fatty acids such as versatic acid, since the fatty acid is incorporated into the molecular structure in a manner resistant to hydrolysis. It is also possible to use epoxy resins whose epoxy groups have been reacted with monohydric alcohols.

In the preferred embodiment polyols with more than two OH groups, such as trimethylolpropane or pentaerythritol, may be used in part to adjust suitable hydroxyl numbers and viscosities. The same also applies as regards the elastification by a slight modification with long-chain dihydric alcohols such as hexanediol-1,6 or aliphatic dicarboxylic acids such as adipic acid.

In the preferred embodiment, as well as also generally, the esterification (first stage) may be carried out in a known manner azeotropically or in the melt at elevated temperatures (e.g. above 190° C.), which yields a clear product with an acid number of for example 0 to 50, preferably 5 to 25, and for example a viscosity of 200 to 3000 mPa·s, measured at 25° C. in a 75% butyl glycol solution.

In order in the preferred embodiment, as well as also generally, to promote the solubility in the aqueous alkaline medium carboxyl groups may in addition be introduced into the OH group-containing polyesters. For this, a reaction is carried out for example with an aromatic or cycloaliphatic dicarboxylic acid that has preferably been formed by defunctionalisation with a long-chain, aliphatic hydrophobic monohydric alcohol from a polycarboxylic acid containing three or four carboxyl groups, such as for example trimesic acid, hemellitic acid, prehnitic acid and mellophanic acid. The process may be carried out in a particularly simple manner by using anhydride compounds such as trimellitic anhydride, pyromellitic anhydride or corresponding hydrogenated ring systems, as well as cyclopentanetetracarboxylic anhydride or pyrazinetetracarboxylic anhydride. The reaction may be carried out for example at temperatures below 190° C.

As monohydric alcohols there may for example be used straight-chain and/or branched, saturated and/or unsaturated primary, secondary and/or tertiary alcohols, preferably primary and/or secondary alcohols. Mixtures, in particular isomeric mixtures, of these alcohols may also be used. Aliphatic C6 to C18 monohydric alcohols as well as benzyl alcohol and its alkyl-substitution products are preferred. Branched-chain C8 to C13 isomonohydric alcohols are particularly preferred. Semi-esters that are particularly stable to hydrolysis are obtained by using α-branched monohydric alcohols or secondary monohydric alcohols such as cyclohexanol or secondary methyloctyl alcohol. Due to the structure of the resin it is ensured that cleavage products (monohydric alcohol and trimellitic acid monoesters) that may possibly be formed by hydrolysis are separated in a trouble-free manner electrophoretically with the film.

The polycarboxylic acids may for example be reacted stoichiometrically in a two-pot process with sufficient monohydric alcohol so that a dicarboxylic acid remains, which is then added to the OH group-containing polyester, for example at temperatures of about 150° to 190° C.

In practice it has proved convenient to produce the carboxyl group-containing polyester in a one-pot process by adding to the OH group-containing polyester the roughly stoichiometric amounts of monohydric alcohol and anhydride group-containing compound such as trimellitic anhydride in the specified sequence.

The incorporation of carboxyl groups may also be effected for example by the co-use of hydroxycarboxylic acids such as for example dimethylolpropionic acid in the polycondensation reaction, whose free carboxyl group does not in general participate in the polycondensation reaction on account of steric hindrance, with the result that the incorporation of this acid takes place exclusively via the hydroxyl groups.

The molar ratios of the overall formulation for the production of the polyester may be chosen so that a viscosity that is suitable for the respective intended application is obtained. The viscosity is preferably about 200 to 3000, preferably 250 to 2000 and particularly preferably 300 to 1500 mPa·s, measured in 50% butyl glycol solution at 25° C. The viscosity may also be adjusted, like the molecular weight, by mixing resins of lower and higher viscosity, and/or lower and higher molecular weights. The upper limit of the acid number is preferably below 100, particularly preferably below 60; the lower limit of the acid number is preferably above 35, particularly preferably above 40. The carboxyl group-containing polyester contains at least one, preferably at least two, carboxyl groups per molecule in order to achieve the water dilutability by salt formation with a low molecular weight base. If the acid number is too low, the solubility may be insufficient, while if the acid number is too high the high degree of neutralisation may lead to an increased electrolysis in the AED bath, which in turn can cause surface defects. The chosen alcohol excess leads to a hydroxyl number of for example about 20 to 150, preferably 60 to 120, in the finished resin. Resins are preferred that have a relatively high hydroxyl number with a low acid number.

The polycondensation may be carried out for example azeotropically or in the melt, for example at reaction temperatures between 160° and 240° C., preferably between 160° and 210° C. After the desired end values as regards viscosity and acid number have been reached, the reaction mixture is cooled to a temperature at which the product has a viscosity that allows water to be incorporated. In practice this means that the melt viscosity is in general not above 40000 mPa·s. As long as the polycondensation is not carried out under pressure, the temperature employed is for example up to about 100° C. In order to convert the product into an aqueous solution or dispersion the carboxyl groups of the polycondensation product are at least partially neutralised by adding a neutralising agent. The neutralising agent may be added before or during the addition of water, but may also be present in the water in which the polycondensation product is dispersed. In this connection high-speed agitator paddle devices, rotor/stator mixers or high-pressure homogenisers are used for example. Organic solvents may if desired be removed by distillation during or after the conversion to the aqueous solution or dispersion.

Suitable neutralising agents are conventional bases such as for example NaOH, KOH, LiOH, ammonia, primary, secondary and tertiary amines such as diethylamine, triethylamine, morpholine; alkanolamines such as diisopropanolamine, dimethylaminoethanol, triisopropanolamine, dimethylamino-2-methylpropanol; quaternary ammonium hydroxides or optionally also minor amounts of alkylenepolyamines such as ethylenediamine. Mixtures of such neutralising agents may also be used.

The amount of neutralising agent is for example chosen so that an MEQ value of 15 to 90, preferably 20 to 60 milliequivalents of amine per 100 g of solid resin is obtained.

Polyacrylate resins suitable as binders for the electrodeposition lacquers include for example carboxyl group-containing and/or sulfone group-containing copolymers with an acid number of 20 to 150. The number average molecular weight Mn is for example 1000 to 10000.

The binders are produced according to conventional processes by copolymerisation of olefinically unsaturated monomers, in which monomers containing acid groups are copolymerised with further monomers. The monomers containing acid groups are used for the purpose of incorporating carboxylic acid and/or sulfonic acid groups into the copolymers in order to ensure, after at least partial neutralisation of these groups, the water solubility or water dispersibility of the copolymers.

Suitable acid group-containing monomers are in principle all olefinically unsaturated polymerisable compounds that contain at least one carboxylic acid and/or sulfonic acid group, such as for example olefinically unsaturated monocarboxylic or dicarboxylic acids such as (meth)acrylic acid, crotonic acid, fumaric acid, maleic acid, itaconic acid or the semi-esters of fumaric acid, maleic acid or itaconic acid, or olefinically unsaturated compounds containing sulfonic acid groups such as for example 2-acrylamido-2-methylpropanesulfonic acid or arbitrary mixtures of such olefinically unsaturated acids. Acrylic acid and methacrylic acid are particularly preferred.

In order to achieve desired application technology properties in the finished lacquer the copolymers may contain in addition to the acid group-containing monomers further monomers containing functional groups, with which for example crosslinking reactions can be carried out. In this connection self-crosslinking of the copolymers as well as external crosslinking with other components additionally introduced into the lacquer may take place. Furthermore all non-functional, olefinically unsaturated monomers may in principle be co-used in the production of the copolymers.

Examples of such functional groups are hydroxy, amino, amido, keto, aldehyde, lactam, lactone, isocyanate, epoxy and silane groups. Olefinically unsaturated monomers that carry such functional groups are known. Hydroxy and epoxy groups are preferred.

Suitable non-functional monomers are for example esters of acrylic acid and methacrylic acid whose alcohol components contain 1 to 18 C atoms, vinyl aromatic compounds, vinyl esters of aliphatic monocarboxylic acids, and acrylonitrile and methacrylonitrile.

The production of the copolymers may be carried out by polymerisation according to conventional processes. The production of the copolymers is preferably carried out in organic solvents. Either continuous or discontinuous polymerisation processes may be used.

Suitable solvents are aromatic compounds, esters, ethers and ketones. Glycol ethers are preferably used.

The copolymerisation is carried out for example at temperatures between 80° and 180° C. using conventional initiators such as for example aliphatic azo compounds or peroxides. In order to regulate the molecular weight of the copolymers conventional regulators may be employed. After completion of the polymerisation the copolymers may be neutralised and converted into an aqueous solution or dispersion, as described in the case of the polycondensation resins, and the organic solvent may optionally be distilled off. Examples of basic neutralising agents are those described hereinbefore for the neutralisation of the polyester resins.

Polyurethane resins that are suitable as binders for the electrodeposition lacquers include for example anionic polyurethane resins that contain carboxylic acid, sulfonic acid and/or phosphonic acid groups present in salt form. The binders are produced in a manner known per se from polyols, polyisocyanates and optionally chain extenders.

The polyurethane resins may be produced in bulk as well as in organic solvents that do not react with isocyanates. The resins are converted into the aqueous phase after neutralising the acid groups, as described in the case of the polycondensation resins. It is also possible to produce the polyurethane resins in a stepwise manner.

Thus, it is possible for example first of all to produce a prepolymer containing acid groups and terminal isocyanate groups in organic solvents, which after neutralisation of the acid groups with tertiary amines undergoes chain extension and is converted into the aqueous phase, during which the organic solvents may be removed by distillation.

The polyols used for the production of the prepolymer may be low molecular weight and/or high molecular weight polyols and may also contain anionic groups.

Low molecular weight polyols preferably have a number average molecular weight Mn of 60 to 400 and may contain aliphatic, alicyclic or aromatic groups. They may for example be used in an amount of up to 30 wt. % of the overall polyol constituents.

Suitable low molecular weight polyols include for example diols, triols and polyols such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, pentaerythritol, 1,2-cyclohexanediol, 1,4-cyclohexanedimethanol, bisphenol A, bisphenol F, hydrogenated bisphenol A as well as mixtures of these polyols.

High molecular weight polyols consist of linear or branched polyols with an OH number of 30 to 150. They may be used for example in an amount of up to 97 wt. % of the overall polyol constituents. The polyols are saturated or unsaturated polyester and/or polyether diols and/or polycarbonate diols with a number average molecular weight Mn of 400 to 5000 or mixtures thereof.

Suitable linear or branched polyether diols are for example poly(oxyethylene)glycols, poly(oxypropylene)glycols and/or poly(oxybutylene)glycols.

Polyester diols are preferred and are produced in a known manner by esterification of dicarboxylic acids or their anhydrides with diols. In order to produce branched polyesters, polyols or polycarboxylic acids of higher functionality may also be used in small amounts.

The groups capable of anion formation may be derived from the polyester or may be incorporated into the prepolymer by the co-use of compounds that contain two H-active groups that react with isocyanate groups and at least one group capable of anion formation. Suitable groups reacting with isocyanate groups are in particular hydroxyl groups as well as primary and/or secondary amino groups. Groups that are capable of anion formation include for example carboxylic acid, sulfonic acid and/or phosphonic acid groups. Examples of such compounds are dihydroxycarboxylic acids such as dihydroxypropionic acid, dihydroxybutyric acid, dihydroxysuccinic acid, diaminosuccinic acid and, preferably, α, α-dimethylolalkane acids such as for example dimethylolpropionic acid.

Suitable polyisocyanates include aliphatic, cycloaliphatic and/or aromatic polyisocyanates with at least two isocyanate groups per molecule and the derivatives of these diisocyanates known per se containing biuret, allophanate, urethane and/or isocyanate groups, as well as mixtures of these polyisocyanates. The isomers or isomeric mixtures of organic diisocyanates are preferably used.

The polyisocyanate component used for the production of the prepolymer may also contain small amounts of higher functional polyisocyanates.

The production of the prepolymer is conveniently carried out in the presence of catalysts such as for example organotin compounds or tertiary amines.

The conversion of the polyurethane resin into the aqueous phase is carried out, as described in the case of the polyester resins, after neutralisation of the acid groups of the polyurethane resin with a basic neutralising agent, optionally with the distillative removal of organic solvents.

Examples of basic neutralising agents are those described hereinbefore for the neutralisation of the polyester resins.

The crosslinking of the binders contained in the electrodeposition lacquers used according to the invention is preferably carried out during the stoving, by reaction with a crosslinking agent. Normally crosslinking agents are added separately; obviously the binders may also contain reactive functional groups that lead to a self-crosslinking. As crosslinking agents and/or crosslinking components there may be used compounds commonly known to the person skilled in the art. Examples include aminoplastic resins, in particular melamine-formaldehyde resins; phenolic resins; blocked polyisocyanates or transesterification crosslinking agents such as polyesters or polyurethane esters with hydroxyalkyl ester groups, alkyl ester derivatives of acetoacetic acid or malonic acid, tris(alkoxycarbonylamino)triazine derivatives and mixtures of these components, that can form highly crosslinked coatings with or without the action of catalysts. Melamine resins and blocked polyisocyanates are preferred.

The blocked polyisocyanates contain on average more than one isocyanate group, preferably at least two isocyanate groups per molecule. They should be stable when stored in the aqueous phase at a roughly neutral to weakly basic pH value, should dissociate under the action of heat at about 100° to 200° C., and should be able to crosslink with the reactive hydroxyl and/or carboxyl groups present in the resin structure.

Blocked polyisocyanates are obtained by reacting polyisocyanates with monofunctional compounds containing active hydrogen.

As polyisocyanates that may be used individually or as a mixture in blocked form as crosslinking agents, arbitrary organic diisocyanates and/or polyisocyanates are suitable that contain aliphatically, cycloaliphatically, araliphatically and/or aromatically bound free isocyanate groups.

Preferred are polyisocyanates that contain about 3 to 36, particularly preferably 8 to 15 carbon atoms. Examples of suitable diisocyanates are toluylene diisocyanate, diphenylmethane diisocyanate and, in particular, hexamethylene diisocyanate, tetramethylxylylene diisocyanate, isophorone diisocyanate, dicyclohexylmethane diisocyanate and cyclohexane diisocyanate.

"Lacquer polyisocyanates" based on hexamethylene diisocyanate, isophorone diisocyanate and/or dicyclohexylmethane diisocyanate are for example eminently suitable, and consist of derivatives known per se of these diisocyanates that contain biuret, urethane, uretdione and/or isocyanurate groups.

Monofunctional compounds containing active hydrogen that may be used to block the polyisocyanates are known to the person skilled in the art. By way of example there may be used CH-acidic compounds such as acetylacetone; CH-acidic esters such as alkyl acetates, malonic acid dialkyl esters; (cyclo)aliphatic alcohols such as n-butanol, 2-ethylhexanol, cyclohexanol; glycol ethers such as butyl glycol, butyl diglycol; phenols such as cresol, tert.-butylphenol; diaminoalcohols such as dimethylaminoethanol; oximes such as butanone oxime, acetone oxime, cyclohexanone oxime; lactams such as ε-caprolactam or pyrrolidone-2; imides; hydroxyalkyl esters; hydroxamic acid and its esters; pyrazoles.

The polyisocyanates may be blocked with identical or different blocking agents within a molecule. Mixtures of identically or variously blocked polyisocyanates may also be used.

The melamine-formaldehyde resins crosslink for example with the hydroxyl groups of the polyester resin, with the formation of ether groups. These crosslinking agents are for example triazines such as melamine or benzoguanamine condensed according to known industrial processes with aldehydes, in particular formaldehyde, in the presence of alcohols such as methanol, ethanol, propanol, butanol or hexanol. Preferably these crosslinking agents are methanol-etherified melamine resins such as e.g. Cymel 325®, Cymel 327®, Cymel 350®, Cymel 370®, Maprenal MF 927®; butanol-etherified or isobutanol-etherified melamine resins such as e.g. Setamin US 138®or Maprenal MF 610®; mixed-etherified melamine resins, as well as in particular hexamethylol melamine resins such as e.g. Cymel 301® or Cymel 303®.

Conventional pigments, fillers, corrosion inhibitors and lacquer auxiliary substances may be used to pigment the anodic electrodeposition lacquer as long as they do not take part in interfering reactions with water in the weakly basic to neutral pH range and do not entrain water-soluble interfering foreign ions. The pigments and fillers are the fillers and inorganic or organic chromophoric and/or special effect pigments that may normally be used in the lacquer industry.

Examples of inorganic chromophoric pigments include titanium dioxide, micronised titanium dioxide, zinc sulfide, lithopone, lead carbonate, lead sulfate, tin oxide, antimony oxide, iron oxides, chromium yellow, nickel-titanium yellow, chromium orange, molybdate red, manganese violet, ultramarine violet, ultramarine blue, cobalt blue, chromium oxide green and carbon black.

Examples of chromophoric organic pigments are those from the groups comprising azo, phthalocyanine, quinacridone, perylene, perinone, anthraquinone, thioindigo and diketopyrrolopyrrole pigments. Examples of special effect pigments are metal pigments, especially of aluminium, copper or other metals; interference pigments such as for example metal oxide-coated metal pigments or metal oxide-coated micas; pearlescent pigments and optically variable pigments (OVP).

Examples of fillers include calcium carbonate, barium sulfate, talcum, silicon dioxide, aluminium silicates, magnesium silicates, mica, aluminium hydroxide and silicic acids. The fillers may also be modified (coated) with organic compounds. Examples of such modified fillers are coated micronised aluminium oxide or coated micronised silicon dioxide.

The pigments may be dispersed in a conventional manner known to the person skilled in the art, in part of the binder dispersion or in a conventional paste resin. The composition of the constituents for an optimal dispersion is determined separately for each dispersion unit. Suitable dispersion units are for example agitator plate devices, three-roller mills, ball mills or, preferably, sand mills or bead mills. Conventional auxiliary substances such as for example antifoaming agents, dispersion aids and agents for controlling the rheology may also be added during the dispersion.

The aqueous electrodeposition lacquer that may be anodically deposited according to the invention may also contain conventional lacquer auxiliary substances and additives such as biocides, light-stability agents and flow-control agents. Further hydrophilic and/or hydrophobic polymers with or without reactive groups or mixtures of these polymers may also be employed.

Examples of such polymers are saturated or unsaturated acrylate, polyurethane or polyester resins, acrylic-modified acrylate, polyurethane or polyester resins, epoxy resins, aminoplast resins, phenolic resins, hydrocarbon resins, silicon-modified acrylate, polyurethane or polyester resins, copolymers of butadiene and acrylonitrile, and styrene-allyl alcohol copolymers.

The anodic electrodeposition lacquers are converted into the processing state (electro-dipcoating bath) by dilution with fully deionised water, optionally after addition of further neutralising agents.

In the ready-for-use state the electro-dipcoating baths have for example a solids content of 8 to 25 wt. %, preferably 10 to 15 wt. %. The MEQ value is preferably 30 to 150, particularly preferably 40 to 80. The content of organic solvents is for example 0.1 to 10 wt. %, preferably less than 5 wt. %.

The deposition is carried out in a conventional manner, for example by applying a direct voltage of 50 to 500 volts, with a coating time of 0.5 to 5 minutes and at a temperature of the electro-dipcoating bath of 15° to 35° C.

The process according to the invention is suitable for coating workpieces with an electrically conducting surface, in particular for the priming and one-layer lacquering of domestic appliances and electrical equipment, steel furniture, building and construction components, building machinery and agricultural machinery, automobile bodies and automobile fittings and accessories.

By means of the procedure according to the invention an improvement of the edge protection is achieved and an adjustment of the degree of matteing is possible, also combined with good handling properties. The mixed esters used according to the invention are very compatible with anionic binders, whereby there is achieved a higher bath stability as well as a lesser redissolution of the deposited lacquer material in rinsing zones of a unit or in the case of possible malfunctions, such as power failure, in which a coated substrate rests in the electro-dipcoating bath, than is possible with the conventionally used phosphoric acid epoxy esters.

EXAMPLE 1

Production of a Phosphoric Acid Epoxy Ester 26.44 wt. % of sec.-butanol are placed in a reaction vessel equipped with stirrer, thermometer and reflux condenser and heated to 80° to 100° C. 38.51 wt. % of Epikote® 1001 (Shell) (condensation product of bisphenol A and epichlorohydrin, epoxy equivalent weight 450 to 500) are scattered into this batch and completely dissolved at 80° to 100° C. while stirring. The reaction mixture is cooled to 80° C. and a mixture of 1.4 wt. % of 85% phosphoric acid and 0.31 wt. % of fully deionised water is added in portions. The reaction mixture is heated at 80° to 110° C. under gentle refluxing and maintained at this temperature until an acid number of 22 to 26 mg KOH/g is reached. After cooling the reaction mixture to 80°-90° C., 1.87 wt. % of 50% dimethylethanolamine is added and homogenised for 30 minutes. 30.56 wt. % of fully deionised water is then added in one go and stirred for 30 minutes, the temperature falling to 25° to 35° C.

| Characteristic data: | |
|---|---|
| Solids content (30 mins, 150° C.): | 37 to 41% |
| MEQ-amine: | 35 to 38 milliequivalents amine/100 g solid resin |

EXAMPLE 2

Production of an Aqueous Polyester Resin Dispersion Without Hardener Resin for the Anodic Electro-dipcoating A mixture of 1.80 parts by weight of diethanolamine and 3 parts by weight of fully deionised water is added at 100° C. to 57.00 parts by weight of a polyester resin with an acid number of 49 and a hydroxyl number of 60 (produced from 26.17 parts by weight of neopentyl glycol, 5.43 parts by weight of trimethylolpropane, 10.83 parts by weight of isophthalic acid, 21.45 parts by weight of isodecanol and 36.12 parts by weight of trimellitic anhydride) contained in a reaction vessel equipped with stirrer, thermometer and reflux condenser and stirred for 10 minutes to form a homogeneous mixture, following which 0.15 part by weight of a commercially available biocide is also stirred in for 10 minutes to form a homogeneous mixture. 38.05 parts by weight of fully deionised water are added while stirring. The mixture is stirred for 90 minutes at 80° C. and is then cooled rapidly to 25° C.

| Characteristic data: | |
|---|---|
| Solids content (30 mins, 180° C.): | 53 to 57% |
| MEQ-amine: | 30 to 35 milliequivalents amine/100 g solid resin |

EXAMPLE 3

Production of an Aqueous Binder Dispersion for the Anodic Electro-dipcoating with Hardener Resin 12.10 parts by weight of the commercially available melamine resin Cymel 303 (Cytec) are added while stirring to 87.90 parts by weight of the polyester resin dispersion produced under 2 and then homogenised for 30 minutes.

| Characteristic data: | |
|---|---|
| Solids content (calculated): | 60.4% |
| MEQ-amine: | 26 to 30 milliequivalents amine/100 g solid resin |

EXAMPLE 4

Production of an Aqueous Binder Dispersion for the Anodic Electro-dipcoating with Hardener Resin and Phosphoric Acid Epoxy Ester 10.80 parts by weight of the commercially available melamine resin Cymel 303 (Cytec) and 11.00 parts by weight of the phosphoric acid epoxy ester produced in Example 1 are added while stirring to 78.20 parts by weight of the polyester resin dispersion produced in 2 and then homogenised for 30 minutes.

| Characteristic data: | |
|---|---|
| Solids content (calculated): | 58.1% |
| MEQ-amine: | 31 to 35 milliequivalents amine/100 g solid resin |

EXAMPLE 5

Production of an Aqueous Black Pigment Paste

To produce 100 kg of a black pigment paste, 24.50 kg of 75% paste resin are placed in a dissolver and neutralised with 2.18 kg of a 50% diisopropanolamine solution, and then diluted with 40.90 kg of fully deionised water.

2.50 kg of a polybutylene, 2.21 kg of a channel carbon black, 2.21 kg of a furnace carbon black as well as 25.50 kg of aluminium hydrosilicate are then added in the specified order while stirring.

The grinding material thus obtained is stirred for 15 minutes at 40° C. After a swelling time of 12 hours the grinding material is dispersed in a Coball mill under specified conditions.

| Characteristic data: | |
|---|---|
| Solids content (calculated): | 50% |
| MEQ-amine: | 12-17 milliequivalents amine/100 g solid resin |

Example 6

Formulation of an Electro-dipcoating Bath with Phosphoric Acid Epoxy Ester 1452.50 g of fully deionised water are placed in a 2 liter capacity beaker. 5.00 g of 50% diisopropanolamine and 5.00 g of dimethylethanolamine are added in succession while stirring. 385.80 g of the dispersion produced in Example 4 together with hardener resin and phosphoric acid epoxy ester are added stepwise while stirring. After a homogenisation time of 10 minutes 151.70 g of the pigment paste produced in Example 5 are slowly added while stirring.

After a homogenisation time of about 1 hour the electro-dipcoating bath is ready for coating.

| Characteristic data: | |
|---|---|
| Solids content (calculated): | 15% |
| MEQ-amine: | 51.2 milliequivalents amine/100 g solid resin |

EXAMPLE 7

Production of an Electro-dipcoating Bath Without Phosphoric Acid Epoxy Ester (Comparison)

1467.20 g of fully deionised water are placed in a 2 liter capacity beaker. 5.00 g of 50% diisopropanolamine and 5.00 g of dimethylethanolamine are added in succession while stirring. 371.1 g of the dispersion produced in Example 3 together with hardener resin are added stepwise while stirring. After a homogenisation time of 10 minutes 151.70 g of the pigment paste produced in Example 5 are slowly added while stirring.

After a homogenisation time of about 1 hour the electro-dipcoating bath is ready for coating.

| Characteristic data: | |
|---|---|
| Solids content (calculated) : | 15% |
| MEQ-amine: | 49.0 milliequivalents amine/100 g solid resin |

EXAMPLE 8

Test Protocol and Test Results

Test sheets are coated and stoved using the electro-dipcoating baths formulated in Examples 6 and 7.

| Preliminary treatment: | iron phosphating (Unibond WH/W) | |
|---|---|---|
| Voltage: | 220 ± 40 V | |
| Electrode spacing: | 5 cm | |
| Coating time: | 180 sec. | |
| Bath temperature: | 30° C. | |
| Stoving conditions: | 25 mins at 180° C. in a laboratory circulating air furnace | |
| Layer thickness: | 30 ± 3 μm | |
| Tests: | Gloss measurement according to DIN 67530 60° geometry | |
| | 120 hrs. salt spray test according to DIN 50021 SS | |
| | 240 hrs. salt spray test according to DIN 50021 SS | |
| Test results: | Invention Example 6 | Comparison Example 7 |
| Gloss measurement: | 19 units according to DIN 67530 60° geometry | 45 units |
| | 120 hours salt spray test according to DIN 50021 SS | |

| Evaluation according to ISO 4628 | | | |
|---|---|---|---|
| Surface rust | x | 0 | 0-1 |
| Edge rust | xx | 0-1 | 4 | x  0 = no surface rust
    5 = severe surface rust
xx 0 = no edge rust
    5 = severe edge rust (100%)

The invention claimed is:

1. A process of preparing an aqueous anodic electro-dipcoating bath comprising the steps of:
   A) preparing an acid epoxy ester having an acid number of 10-50 by reacting in the presence of at least one aliphatic alcohol having 1-6 carbon atoms, wherein said at least one aliphatic alcohol is selected from the group consisting of methanol, ethanol, isopropanol, n-propanol, n-butanol, sec-butanol, tert-butanol, and hexanol:
      1) at least one epoxy compound having at least one epoxy group and having an epoxy equivalent weight of 90 to 4000 g/equivs selected from the group consisting of monomeric epoxy compounds, oligomeric epoxy compounds, and polymeric epoxy compounds; and
      2) at least one compound having at least one acid group selected from the group consisting of phosphoric acids, phosphonic acids, phosphoric acid esters, phosphonic acid esters, and mixtures thereof;
   wherein the ratio of epoxy groups to acid groups is from 1:1 to 3:1 and
   wherein a mixed ester with the at least one aliphatic alcohol is formed;
   B) neutralising free acid functions of the acid epoxy ester prepared in Step A; and blending with at least one film-forming binder selected from the group consisting of polyacrylate resins, polyester resins, polyurethane resins and mixtures thereof and
   C) diluting the composition prepared in Steps A and B with fully deionised water to provided the anodic electro-dipcoating bath having a 1 to 15 wt. % binder solids content of the acid epoxy ester;
   wherein the polyester resin of step B) is derived from reactants consisting of a polycarboxylic acid, polyol and optional dialkyl ester; said polycarboxylic acid selected from the group consisting of aliphatic dicarboxylic acids, cycloaliphatic dicarboxylic acids, aromatic dicarboxylic acids, tribasic carboxylic acids, tetrabasic carboxylic acids, anhydrides of any of said acids and any mixtures thereof; said polyol selected from the group consisting of dihydric alcohols, polyols having 3-4 hydroxyl groups and any mixtures thereof and said dialkyl ester being incorporated into the polyester by transesterification; and
   whereby the anodic electro-dipcoating bath being used for electrocoating vehicles or parts thereof.

2. The process according claim 1, further comprising the step of adding to the aqueous anodic electro-dipcoating bath at least one component selected from the group consisting of crosslinking agents, pigments, fillers, and conventional lacquer additives.

3. The process according to claim 1, wherein the at least one compound having at least one acid group is selected from the group consisting of phosphoric acid, phosphoric acid diethyl ester, phosphoric acid triethyl ester, phosphoric acid dibutyl ester, phosphoric acid tributyl ester, hydroxymethanephophonic acid, hydroxyethanephophonic acid, vinylphosphonic acid, allylphosphonic acid, benzylphosphonic acid diethyl ester, and o-phosphoric acid.

4. A substrate electro-dipcoated with the composition prepared according to the process of claim 1.

5. A substrate according to claim 4, wherein the substrate is a motor vehicle or parts thereof.

6. A process of preparing an anodic electro-dipcoating lacquer comprising the steps of:
   A) preparing an acid epoxy ester having an acid number of 10-50 by reacting in the presence of at least one aliphatic alcohol having 1-6 carbon atoms, wherein said at least one aliphatic alcohol is selected from the group consisting of methanol, ethanol, isopropanol, n-propanol, n-butanol, sec-butanol, tert-butanol, and hexanol:
      1) at least one epoxy compound having at least one epoxy group and having an epoxy equivalent weight of 90 to 4000 g/equivs selected from the group consisting of monomeric epoxy compounds, oligomeric epoxy compounds, and polymeric epoxy compounds; and
      2) at least one compound having at least one acid group selected from the group consisting of phosphoric acids, phosphonic acids, phosphoric acid esters, phosphonic acid esters, and mixtures thereof; and wherein the ratio of epoxy groups to acid groups is from 1:1 to 3:1 and and wherein a mixed ester with the at least one aliphatic alcohol is formed;

B) mixing the acid epoxy ester of Step A with at least one binder selected from the group consisting of polyester resins, polyacrylate resins, polyurethane resins, and mixtures thereof neutralising free acid functions of the acid epoxy ester prepared in Step A;

wherein the polyester resin of step B) is derived from reactants consisting of a polycarboxylic acid, polyol and optional dialkyl ester; said dicarboxylic acid selected from the group consisting of aliphatic dicarboxylic acids, cycloaliphatic dicarboxylic acids, aromatic dicarboxylic acids, tribasic carboxylic acids, tetrabasic carboxylic acids, anhydrides of any of said acids and any mixtures thereof, said polyol selected from the group consisting of dihydric alcohols, polyols having 3-4 hydroxyl groups and any mixtures thereof and said dialkyl ester being incorporated into the polyester by transesterification; and whereby the anodic electrocoating lacquer is used to form and electro-dipcoating bath for electrocoating vehicles and parts thereof.

7. The process according to claim 6, further comprising the step of mixing the anodic electro-dipcoating lacquer with at least one component selected from the group consisting of crosslinking agents, pigments, fillers, and conventional lacquer additives.

8. A substrate coated with the composition prepared according to the process of claim 6.

9. A substrate according to claim 8, wherein the substrate is a motor vehicle or parts thereof.

10. The process according to claim 6 wherein the at least one compound having at least one acid group is selected from the group consisting of phosphoric acid, phosphoric acid diethyl ester, phosphoric acid triethyl ester, phosphoric acid dibutyl ester, phosphoric acid tributyl ester, hydroxymethanephophonic acid, hydroxyethanephophonic acid, vinylphosphonic acid, allylphosphonic acid, benzylphosphonic acid diethyl ester, and o-phosphoric acid.

* * * * *